United States Patent
Breeden et al.

(10) Patent No.: US 7,660,735 B1
(45) Date of Patent: Feb. 9, 2010

(54) METHOD AND SYSTEM FOR CREATION OF CONSUMER SEGMENTATIONS USING MATURATION AND EXOGENOUS CURVES

(75) Inventors: Joseph L. Breeden, Glorieta, NM (US); Anthony J. Giancola, Albuquerque, NM (US)

(73) Assignee: Strategic Analytics Inc., Sante Fe, NM (US)

( * ) Notice: Subject to any disclaimer, the term of this patent is extended or adjusted under 35 U.S.C. 154(b) by 983 days.

(21) Appl. No.: 10/216,510

(22) Filed: Aug. 9, 2002

Related U.S. Application Data

(60) Provisional application No. 60/310,843, filed on Aug. 9, 2001.

(51) Int. Cl.
*G06Q 10/00* (2006.01)
(52) U.S. Cl. ...................................................... 705/10
(58) Field of Classification Search .................. 705/10; 708/400
See application file for complete search history.

(56) References Cited

U.S. PATENT DOCUMENTS

| | | | |
|---|---|---|---|
| 6,073,112 A * | 6/2000 | Geerlings | 705/14 |
| 6,078,903 A | 6/2000 | Kealhofer | |
| 6,202,053 B1 | 3/2001 | Christiansen | |
| 6,249,775 B1 | 6/2001 | Freeman | |
| 6,622,126 B1 * | 9/2003 | McArdle et al. | 705/26 |

OTHER PUBLICATIONS

Ramsey, James B; "The contribution of Wavelets to the Analysis of Economic and Financial Data", Sep. 15, 1999, Philosophical Transactions: Mathematical, Physical and Engineering Sciences, vol. 357, No. 1760, Wavelets The Key to Intermittent Information?, pp. 2593-2606.*
Jingyan, Zhang; et.al. "Adaptive Wavelets Classification of Transient Sonar Signals", ICSP 1996, 1996 3rd International Conference on Signal Processing Proceedings, IEEE, New York, vol. 2, pp. 1535-1538.*
Jagielska, Ilona; "Hybrid Rough Sets/Neural Network Approach to the development of a Decision Support System", 1998, IEEE, 0-7803-4859-1/98, pp. 24-28.*
Collier, et.al. "A Perspective on Data Mining", Jul. 1998, Center for Data Insight at Northern Arizona University, pp. 1-39.*
Friedman, Jerome; "On Bias, Variance, 0/1-Loss and the Curse-of-Dimensionality", 1997, Kluwer Academic Publishers, pp. 1-77.*
Leece, D; "Applying data visualization and knowledge discovery in databases to segment the market for risky financial assets", Aug. 1999, vol. 20, Iss 5, p. 267. ProQuest ID 50768441.*

* cited by examiner

*Primary Examiner*—Jonathan G Sterrett
(74) *Attorney, Agent, or Firm*—John S. Paniaguas; Katten Muchin Rosenman LLP

(57) ABSTRACT

A system and method for segmenting and clustering consumer segments is disclosed. The system and method disclosed decompose micro-segments into maturation curves, exogenous curves and scaling parameters. The system and method of the present invention use these generated curves to cluster micro-segments into macro-segments for business analysis purposes.

15 Claims, 16 Drawing Sheets

| Segment 1 | Segment 2 | Segment 3 | Segment 4 | Segment 5 |
|---|---|---|---|---|
| AL | IN | AZ | CA | MD |
| TX | MA | MO | IL | PA |
| GA | WI | CO | | OH |
| NY | NC | MI | | MN |
| VA | NJ | | | TN |
| | FL | | | |

Figure 8

| Segment 1 | Segment 2 | Segment 3 | Segment 4 | Segment 5 |
|---|---|---|---|---|
| AL | MA | AZ | IL | MD |
| FL | NY | CO | MI | PA |
| GA | NJ | CA | IN | OH |
| NC | | | TX | |
| TN | | | MN | |
| | | | MO | |
| | | | VA | |
| | | | WI | |

Figure 11

| Segment 1 | Segment 2 | Segment 3 | Segment 4 | Segment 5 |
|---|---|---|---|---|
| AL | IN | AZ | CA | MD |
| GA | MA | MO | IL | PA |
| FL | WI | CO | MI | OH |
| NC | NY | | TX | MN |
| TN | NJ | | | |
| | VA | | | |

METHOD AND SYSTEM FOR CREATION OF CONSUMER SEGMENTATIONS USING MATURATION AND EXOGENOUS CURVES

CROSS-REFERENCE TO RELATED APPLICATIONS

This application claims priority from U.S. patent application Ser. No. 09/781,310, entitled "Vintage Maturation Analytics for Predicting Behavior and Projecting Cash Flow for Customer Communities and Their Responses to Economic, Competitive, or Management Changes" and from U.S. provisional patent application Ser. No. 60/310,843, filed Aug. 9, 2001, entitled "Creation of Consumer Segmentations Using Maturation and Exogenous Curves". Each of these applications are incorporated herein by reference.

BACKGROUND OF THE INVENTION

1. Field of the Invention

This invention relates to creating cohorts of consumers with uniform behavior (consumer segments) for purposes of target marketing, risk assessment, portfolio forecasting, or other consumer management issues.

2. Background

The standard approach to creating consumer segments is to gather demographic or behavioral data about each consumer and perform a cluster or discriminant analysis to identify groups of like consumers. These approaches are inherently point-in-time—focusing predominantly on how similar or dissimilar the accounts are today. There is a need for a system and method that considers the full projected lifestyle of the accounts to identify groups of consumers who will be dynamically similar throughout the maturation process.

SUMMARY OF THE INVENTION

According to one aspect of the present invention, a method for creating consumer segments includes providing a plurality of micro-segments and decomposing the provided micro-segments to generate a segment maturation curve, a segment exogenous curve and scaling parameters for each micro-segment. According to another aspect of the present invention, a system for creating consumer segments includes a computing device having a segmentation program stored thereon, wherein when the segmentation program is executed micro-segments are retrieved and the micro-segments are processed to decompose the micro-segments into a segment maturation curve, a segment exogenous curve and scaling parameters for each micro-segment. According to a further aspect of the present invention, a computer-readable medium encoded with a segmentation program which, when executed by a computing device, performs a method which includes retrieving micro-segments and the micro-segments are processed to decompose the micro-segments into a segment maturation curve, a segment exogenous curve and scaling parameters for each micro-segment.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings:

FIG. 8 lists the segments created by measuring a distance between maturation curves in Example 1;

FIG. 11 lists the segments created by measuring a distance between exogenous curves in Example 1;

FIG. 14 lists the segments created by measuring the distances between the maturation and exogenous curves in Example 1.

DETAILED DESCRIPTION

Referring to FIGS. 1-5, the modeling approach of the present invention for decomposing historical data into age-based and time-based components, generally called dual-time dynamics is depicted. The modeling approach of the present invention may be implemented in any form most practical for the user. In a preferred embodiment, the modeling approach is implemented as a computer program either resident on a computing device or stored as a set of instructions on a computer-readable medium. Dual-time dynamics is more fully described in co-pending patent application Ser. No. 09/781,310, entitled "Vintage Maturation Analytics for Predicting Behavior and Projecting Cash Flow for Customer Communities and Their Responses to Economic, Competitive, or Management Changes" which claims priority from U.S. provisional patent application Ser. No. 60/184,190, both of which are incorporated herein by reference.

Dual-time dynamics decomposes historical data into age-based and time-based components. Dual-time dynamics derives and interprets the natural, usually non-linear, maturation process for segments of customer accounts. By knowing what should happen under normal conditions, dual-time dynamics is able to quantify the unexpected components of performance and relate them to economic, management, competitive, or other exogenous factors. This decomposition is a critical first step to understanding the underlying drivers of consumer behavior.

The dual-time dynamics system begins with actual historical data for an institution. From this data, dual-time dynamics learns the nonlinear functions governing the way the customer relationship matures with time. Simultaneously, dual-time dynamics quantifies the impact of exogenous variables on these accounts. Knowing the nonlinear functions governing account maturation allows dual-time dynamics to immediately make long-term baseline projections of segment and portfolio risk, revenue, and value.

Figure 1:
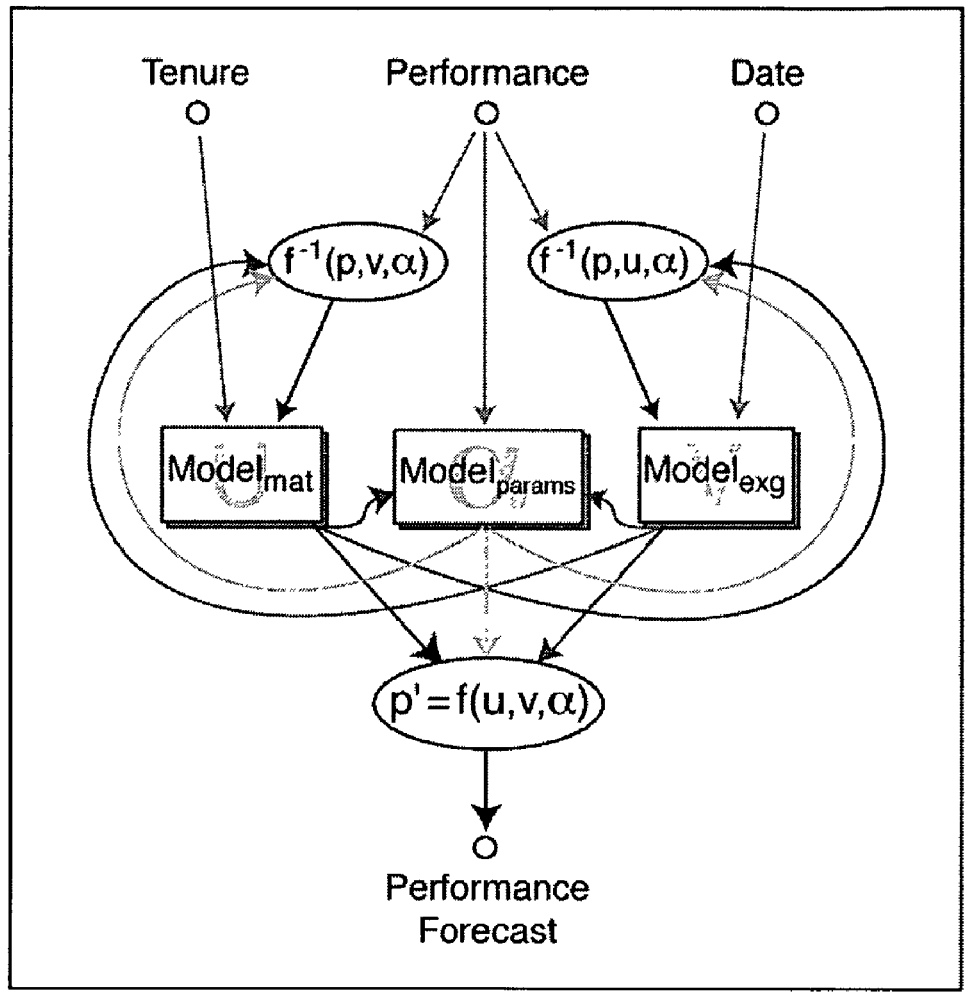
FIG. 1 depicts a schematic of a modeling approach of the present invention to decompose behavior into maturation and exogenous effects with vintage calibration parameters.
Figure 2:
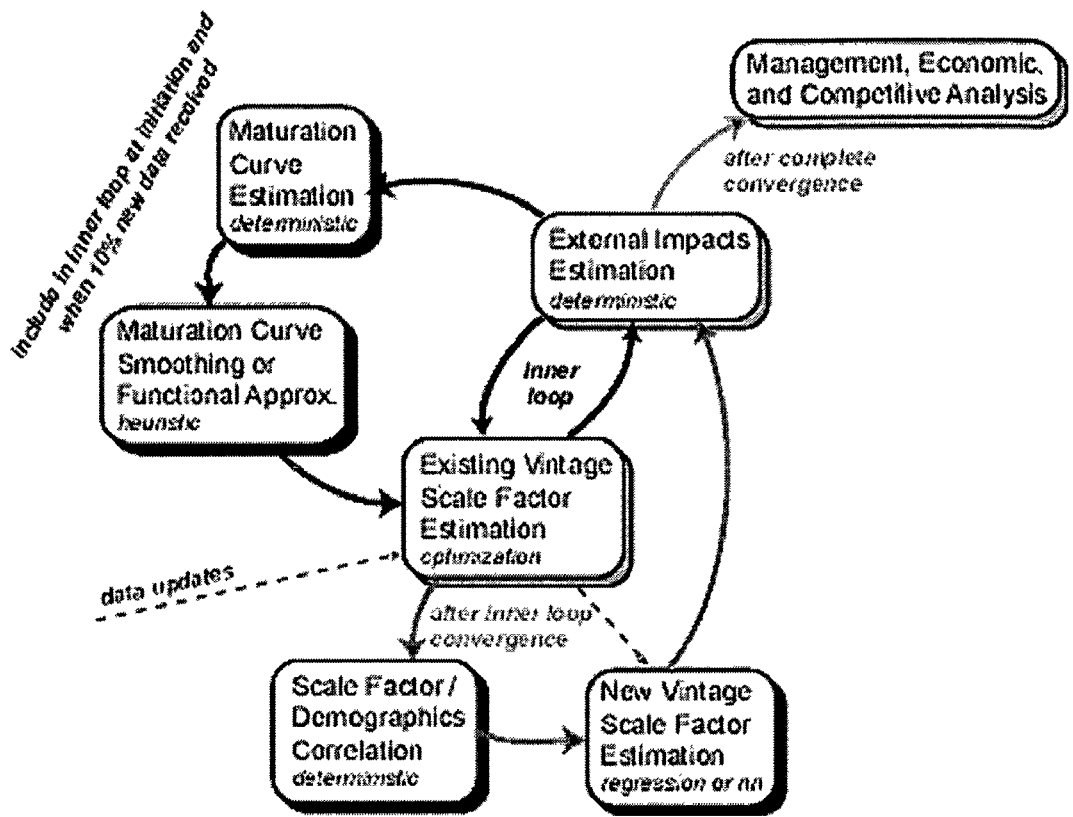
FIG. 2 depicts a flow diagram showing the iterative process of the dual-time dynamics approach of the present invention.
Figure 3:
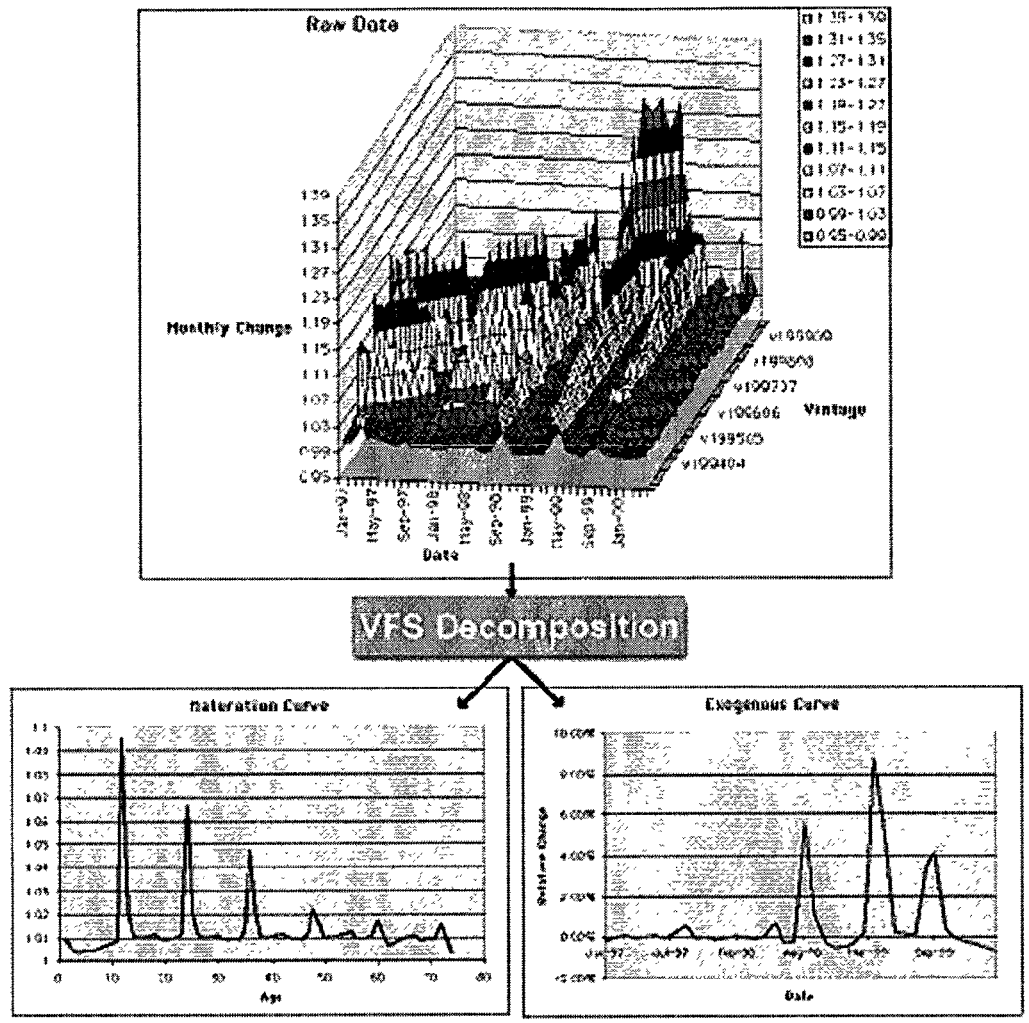
FIG. 3 depicts a visualization of how the modeling approach of the present invention decomposes historical data into age-based (maturation) and time-based (exogenous) effects.

FIG. 1 shows a schematic for the dual-time dynamics approach. Rather than model the historical data with a single model, the dual-time dynamics engine creates two distinct models. The maturation model (U) extracts the tenure-based component of performance while filtering tenure dependence from the input to the exogenous model. Likewise, the exogenous model (V) extracts the date-based component of performance while filtering date dependence from the input to the maturation model. Models U and V may be tabulated functions, neural networks, or other non-linear modeling techniques. Specific vintages are modeled with U, V, and a set of scaling parameters. The modeling and filtering process for U and V and vintage scaling $\alpha$ iterates until all three models have converged. FIG. 2. U becomes a model of the natural consumer dynamics and V captures the environment in which the consumer resides. To make vintage predictions, V is replaced with a possibly new, current environment and combined with U and $\alpha$.

After convergence is attained, the exogenous effects are analyzed to quantify the impact of various management policies, the competitive environment, or economic drivers on consumer behavior. Many groups have tried to quantify the impact of economics and other factors upon consumer behavior, but the dual-time dynamics technology is uniquely capable of quantifying these exogenous factors in the presence of changing portfolio demographics, policies, and competitors.

With explanatory models for the external impacts in hand, managers using dual-time dynamics can make detailed forecasts of future portfolio behavior under a broad range of scenarios. Managers may create detailed scenarios for new bookings, pricing, credit policies, and other factors. Using these scenarios, managers can create real-time forecasts of the impact those scenarios will have upon the portfolio. Similarly, managers can stress test their portfolio by simulating future behavior under a range of economic scenarios.

Dual-time dynamics' simulation capabilities lead naturally to a new level of risk management. Loss, revenue, and profit distributions can be created under a range of possible futures. Managers can thus manage the risk to portfolio value (including credit losses and loss of product revenue) in addition to the mean portfolio value. Dual-time dynamics can also create a distribution of many possible futures from the observed external impacts.

Consumer Segment Generation

Most often, management needs only on order of 10 segments by which to manage, but would like to study hundreds of micro-segments from which to create these aggregated segments. Furthermore, this segmentation review need only be done infrequently since the relationships between segments should change slowly with time. Existing segmentation approaches tend to fall into 3 categories: (1) manual selection, (2) automated clustering based upon demographic similarity, or (3) automated clustering in demographic space based upon net historical performance such as the likelihood of ever being delinquent. The current invention adds a fourth possibility where we decompose the historical performance into maturation and exogenous components and look for similarities over the full lifecycle, in response to the environment, or both. In an optional later step, demographics can be incorporated into the analysis to provide more human-readable segments.

The present invention provides a unique opportunity to compute consumer segmentations based upon behavior dynamics rather than pure demographics. By comparing maturation and exogenous curves between micro-segments, one can find optimal aggregations to get to a manageable number of segments. The present invention allows for taking a large number of micro-segments at one time and distilling them to a core set of aggregated segments in an automated process.

In one embodiment of the present invention, the general steps for segment optimization include: (1) decomposing the maturation and exogenous curves using dual-time dynamics for the $N_v$ variables applied to each of the $N_s$ micro segments; (2) calculating the complete distance matrix between the $N_s$ micro segments, $N_s \times N_s$ elements; (3) clustering the $N_s$ micro segments into a user-defined number of macro segments from the distance matrix and (4) redefining the macro segments in demographic space based upon the macro segment tags.

Analysis of Micro-Segments

For clustering purposes, the present invention creates a driver that cycles over each of the micro-segments producing maturation and exogenous curves for each of the variables of interest. This may be an extremely computer processing intensive process that may be parallelized, even to the point of running on multiple machines.

In this embodiment, each variable is given equal weight in the distance calculation, and variables should, accordingly, be selected with care. The implication is that including all delinquency rates (for example) would give them six times the weight of the attrition rate. A balanced set of variables should be chosen, such as attrition rate, one cycle delinquency rate, contractual write-off rate, credit utilization rate, and payment rate.

Computing the Distance Matrix

Figure 4:
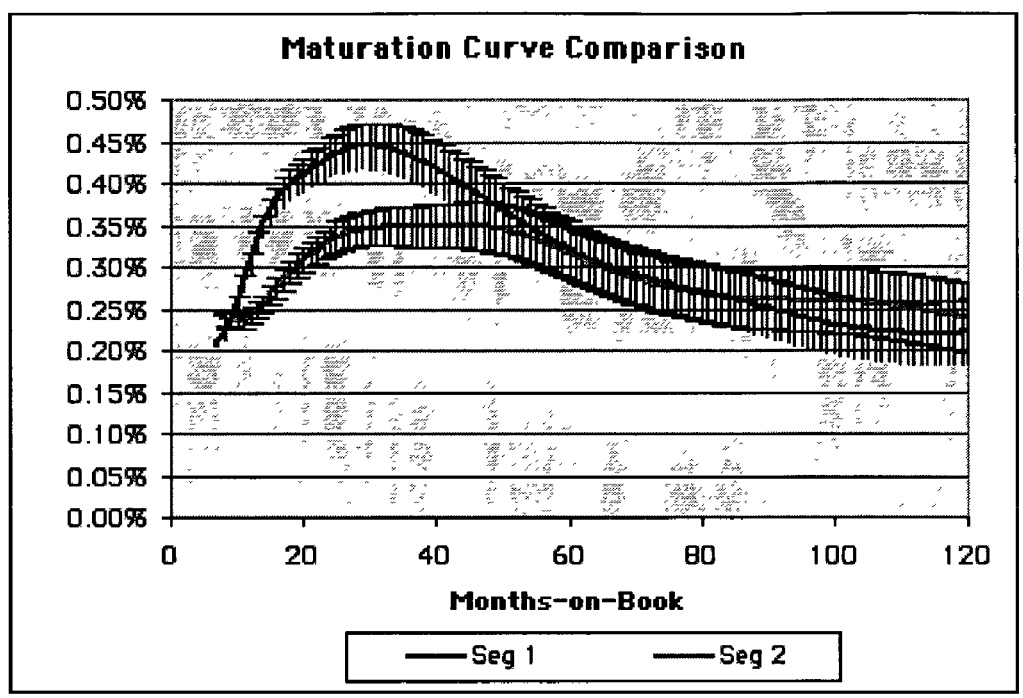
FIG. 4 illustrates exemplary maturation curves with error bars for two segments.
Figure 5:
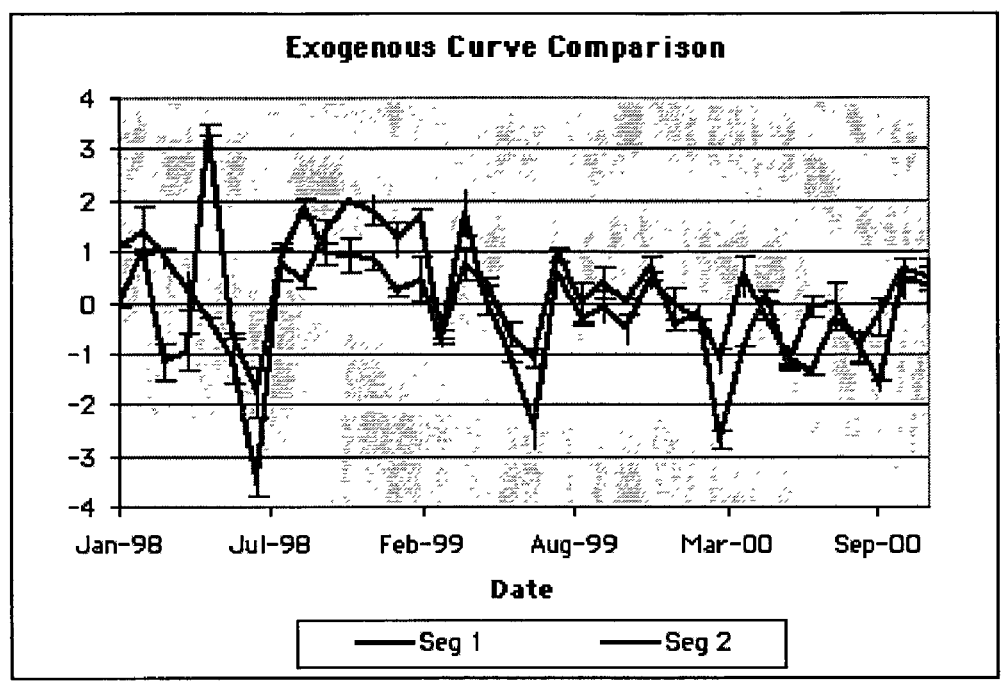
FIG. 5 illustrates exemplary exogenous curves with error bars for two segments.

The distance between two segments is computed as a function of the distance between their maturation and exogenous curves on the selected variables. FIGS. 4 and 5 show examples of such curves.

To compute the distance between two curves, we need to adjust for the associated error bars. At the ith age or time, the distance between points $x_{i1} \pm \delta_{i1}$ and $x_{i2} \pm \delta_{i2}$ in the curve is $$d_{i12} = \frac{x_{i1} - x_{i2}}{\sqrt{\delta_{i1}^2 + \delta_{i2}^2}} \quad \text{(Eq. 1)}$$

This happens to be the formula for the Unequal Variance Student's t-Test, and in effect it is being tested whether these points are statistically different.

The component distances, $d_i$, can be combined into a single distance between the two curves using one of the standard metrics, such as the $L_1$, $L_2$, or $L_\infty$-norm. The $L_1$-norm will likely be most robust to noise, which is important to this embodiment of the present invention. Since there are $N_v$ variables and both maturation and exogenous curves for each, then there is $2N_v$ $L_1$-norms which can be combined simply to a single distance measurement. The result is a distance matrix $D_{jk}$ showing the net distance between any two segments.

For FIGS. 4 and 5, the $L_1$-norm of the component distances are 1.75 sigma for the maturation curve (using ages 0 through 75) and 2.88 sigma for the exogenous curve. In creating optimal segmentations, the distance matrix may be based on the maturation curve distance, the exogenous curve distance, or combination of them to get a net distance is 2.32.

When computing the distances, it may be desirable to adjust the curves to account for irrelevant differences in scale. The mean and deviation of one curve can be renormalized so as to minimize the distance between the curves. Such a resealing guarantees that the distance measured is purely a function of the difference in shape between the curves.

Furthermore, it may be desirable not to have one point along the maturation or exogenous curve dominate our estimate of distance. To compensate, if a set of distance measures is available, $d_{ijk}$ for age I, segment j, and segment k, the deviations across j and k can be computed to produce $\sigma_{d_i}$. The final distance measure is then $$\widetilde{d_{ijk}} = d_{ijk} / \sigma_{d_i} \qquad (EQ\ 2)$$

Clustering in Curve Space

From the distance matrix $D_{jk}$, clusters of micro segments can be turned into macro segments. The number of macro segments will be driven more by business management needs than algorithmic considerations. Several algorithms are available for creating clusters from the distance matrix. However, a simple hierarchical clustering seems well suited to allowing management to choose their desired clustering.

Figure 6A:
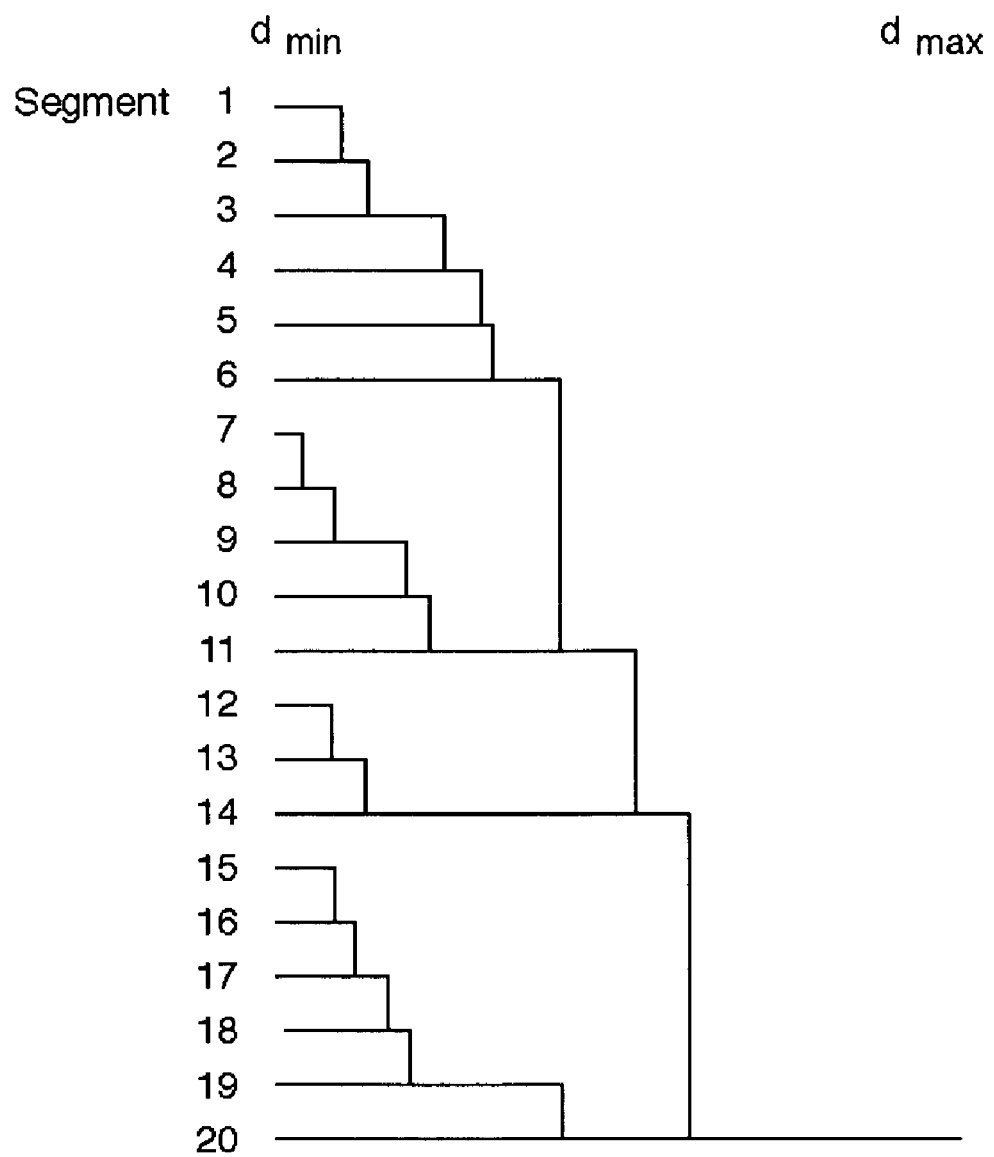
FIG. 6a depicts a hierarchical clustering of twenty micro-segments.

Referring to FIG. 6a, a tree-like plot is created with x-axis running from $d_{min}$ to $d_{max}$. For a chosen value of distance threshold, the clusters can be read directly from the graph. This simple form of hierarchical clusters makes no presumptions about cluster shape. Many of the competing approaches are justified on the intuitive grounds of providing more reasonable shapes. Although in principle such heuristics are appropriate in many business contexts, the simple example shown in FIGS. 4 and 5 requires measuring distance in a 115-dimensional space. If one has ten such variables to consider simultaneously (not an uncommon requirement), then one is working in a 1,150-dimensional space. For such high dimensional space, human intuition about shape is lost and the distance threshold approach is quite appropriate.

Discriminant Analysis in Demographic Space

Figure 6B:
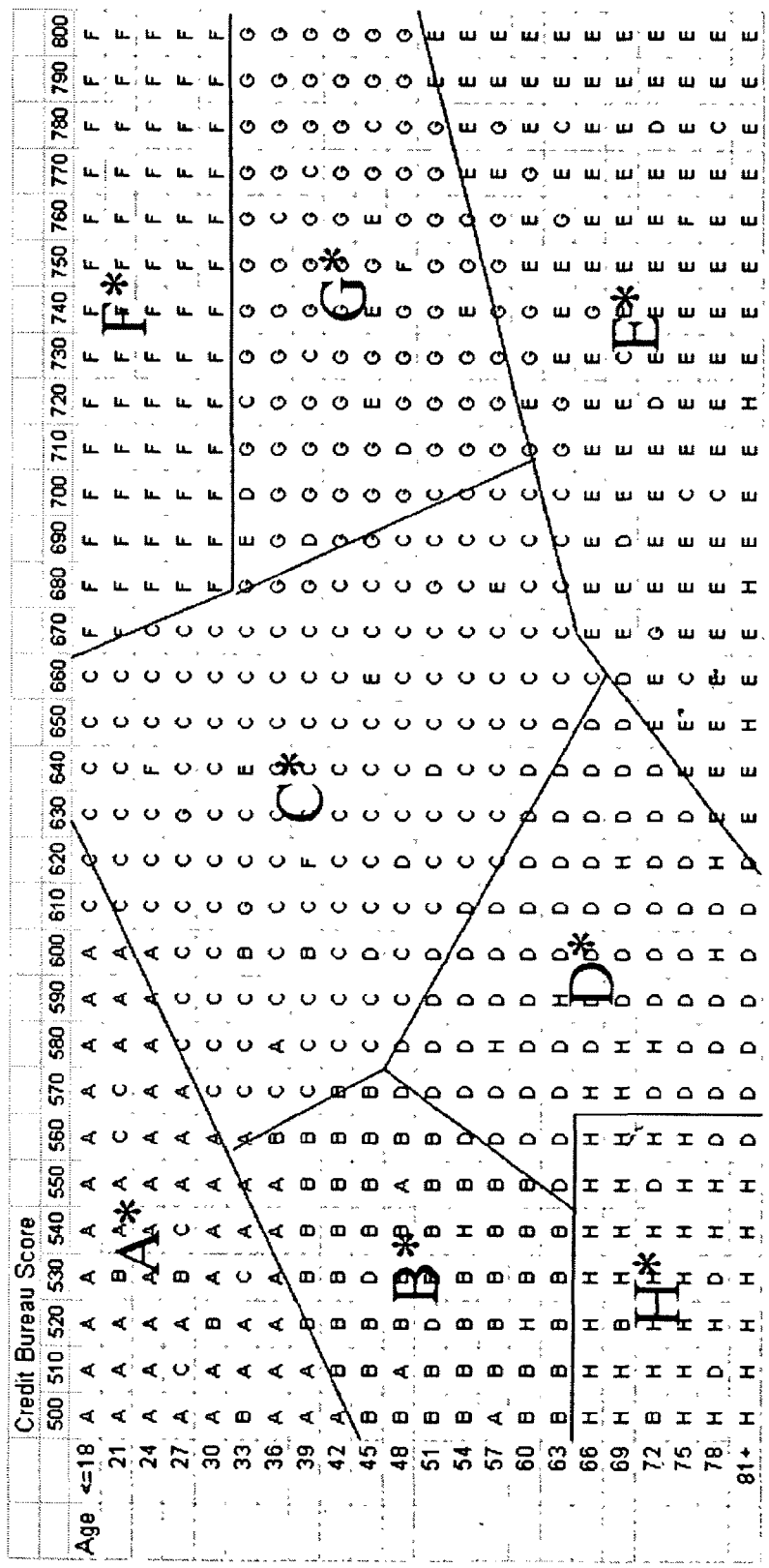
FIG. 6b illustrates tagged micro-segments reclustered in demographic space.

For management systems to effectively employ the created dynamics-based clusters, the clustering needs to be translated into demographics-based rules. Referring to FIG. 6b each of the micro-segments was previously tagged with the label of the macro-segment to which it belongs (i.e., A, B, C, D, E, F, G or H). By arranging these micro-segments as points in a multi-dimensional demographic space, a discriminant analysis can be performed to learn rules in demographics-space for separating the clusters. Discriminant analysis on labeled points is also well studied and several standard algorithms are available. In this embodiment, the discriminant analysis acts on the micro-segments in demographic space to recluster them as A*, B*, C*, D*, E*, F*, G* and H*.

In the discriminant analysis, the exact number of clusters may not be preserved. A dynamically determined cluster may appear in two or more demographically separated regions. Such an occurrence will require that the cluster be split. Aggregating neighboring clusters is a more difficult proposition since the distance matrix should be revisited to determine if aggregation is warranted dynamically. The hierarchical clustering approach described above will facilitate making such decisions.

The invention is further illustrated by the following non-limiting examples.

EXAMPLE 1

Lifecycle Segmentation of Consumer Finance Data

Given a segmentation of consumer credit cards accounts into states, how do we group the states into regions with similar behavior? For this example, the credit utilization rate, payment rate, one month delinquency rate, and bankruptcy rate are considered. These variables represent a broad spectrum of credit card behavior.

The distance calculations were performed on the maturation and exogenous curves using the invention described here including the normalization factor in Equation 2. Intuitively, the maturation and exogenous curves should highlight different aspects of consumer behavior.

Figure 7:
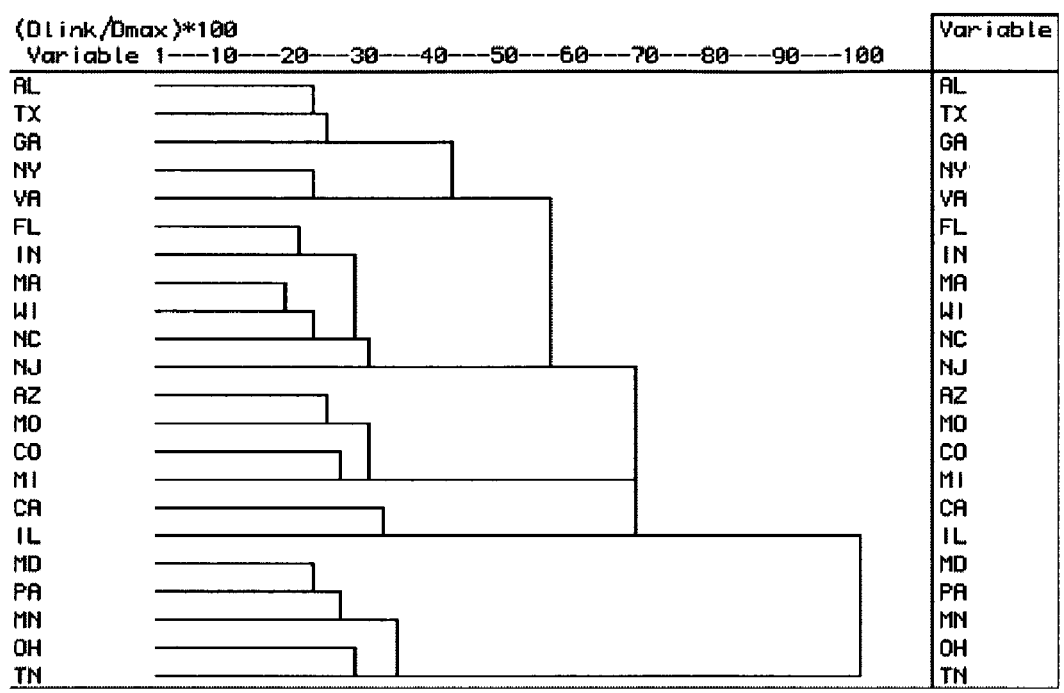
FIG. 7 depicts a hierarchical clustering derived from the data of Example 1 using maturation curves for a set of target variables.
Figure 9:
FIG. 9 depicts the geographic distribution of clusters represented in FIG. 8.

This example was started with a segmentation based upon the maturation curve similarities only. FIG. 7 shows the clustering hierarchy generated with this procedure. For purposes of this example, five segments were selected, FIG. 8. Maturation curves measure the consumers' intrinsic behavior. As such, it is expected that demographic differences in the people who accepted credit cards in those states would drive segmentation. Because the credit card management determines who will receive credit card solicitations, this grouping can appear completely random when displayed geographically, FIG. 9. The selection of the number of segments to create will usually be based upon business realities.

Figure 10:
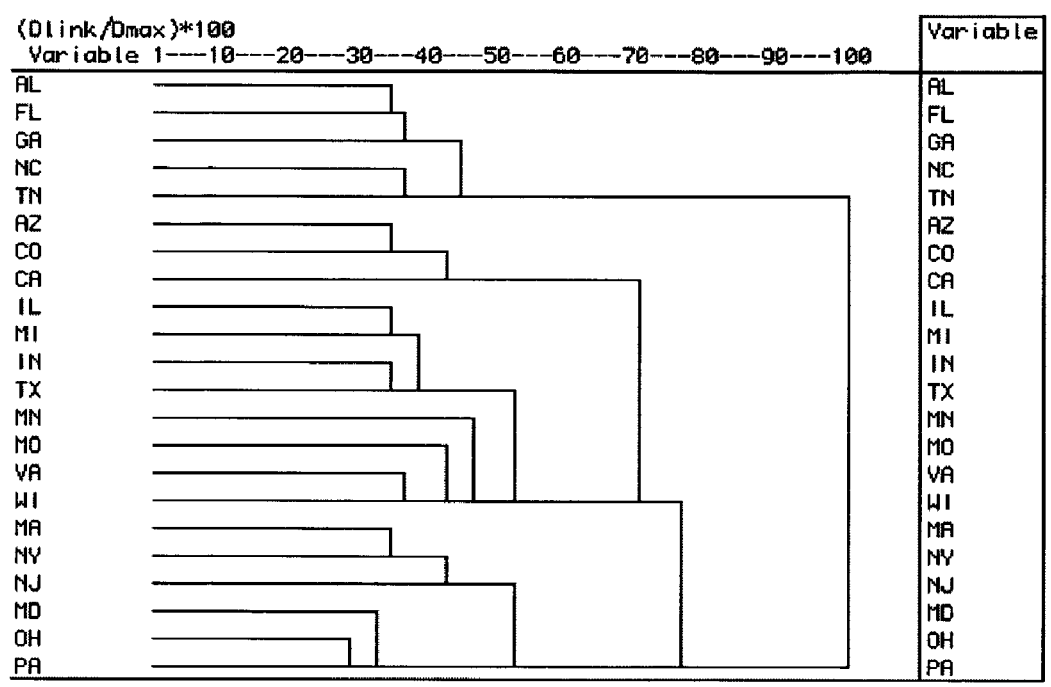
FIG. 10 depicts a hierarchical clustering derived from the data of Example 1 using exogenous curves for a set of target variables.
Figure 12:
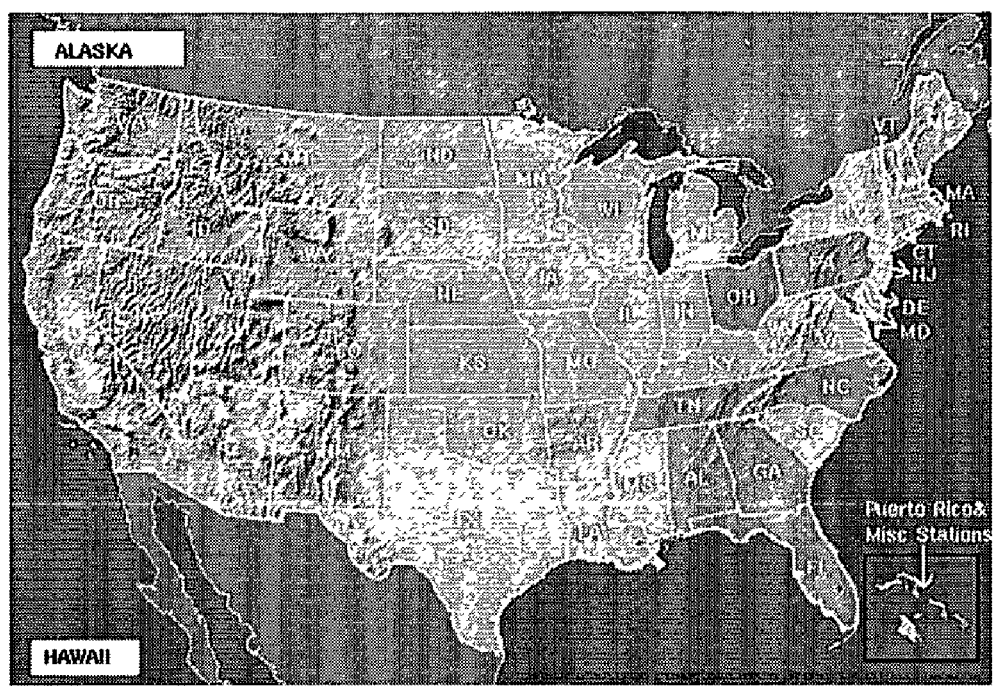
FIG. 12 depicts the geographic distribution of clusters represented in FIG. 11.

In a second test, segmentation was performed considering only the distance between exogenous curves. The results are in FIG. 10, the clustering hierarchy, FIG. 11, the resulting segments, and FIG. 12, a geographical representation of the segments. The exogenous curve represents the consumers' response to the environment. Appropriately, the segmentation suggests that regional economics have a strong influence upon the similarity of consumer behavior. The present invention itself knew nothing of the proximity of the states. The state names were simply micro-segment labels. Nevertheless, the algorithm created regional groupings.

Figure 13:
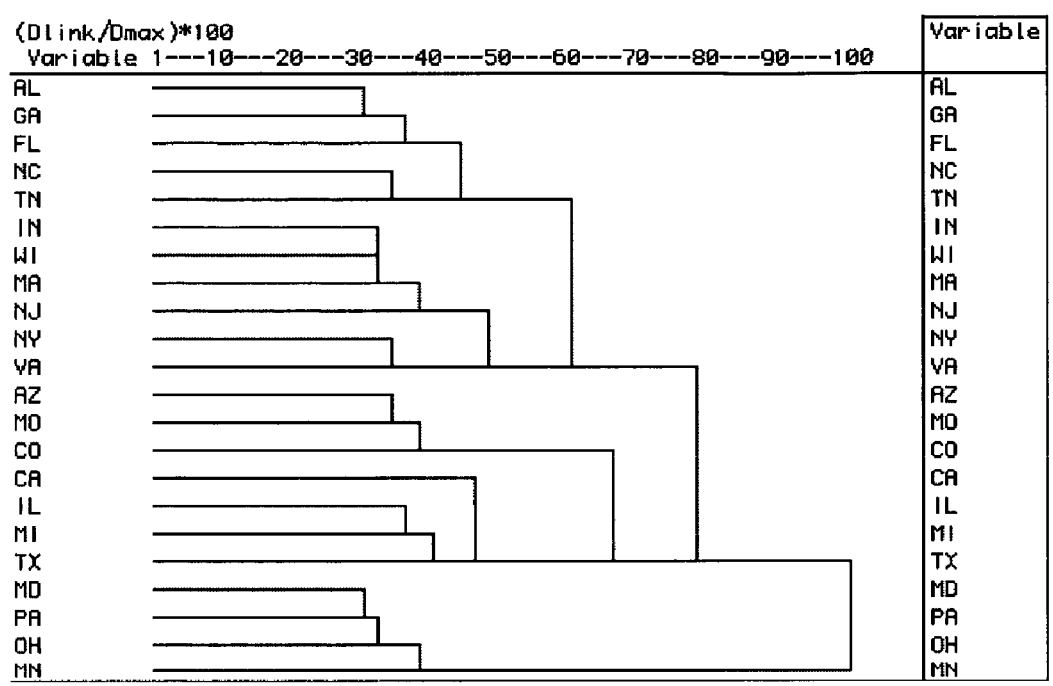
FIG. 13 depicts a hierarchical clustering derived from the data of Example 1 using maturation and exogenous curves for a set of target variables.
Figure 15:
FIG. 15 depicts the geographic distribution of clusters represented in FIG. 14.

Another test combined the maturation and exogenous curve distances into a single segmentation. This represents a compromise between the demographic similarities of the first test and the regional groupings of the second. These results are shown in FIG. 13 through FIG. 15.

The preceding examples can be repeated with similar success by substituting the generically or specifically described reactants and/or operating conditions of this invention for those used in the preceding examples.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above, and of the corresponding application(s), are hereby incorporated by reference.

What is claimed is:

1. A computerized method of identifying segments of consumers having similar behavior, the method comprising the steps of:

(a) storing on a computer readable medium a plurality of micro-segments of consumer behavior;

(b) retrieving said micro-segments by a computing device which decomposes said micro-segments under program control into age based components defining a segment maturation curve and time based components defining a segment exogenous curve and scaling parameters for each micro-segment;

(c) said computing device calculating under program control a distance matrix between the micro-segments based on at least one of the generated decomposed curves; and (d) said computing device identifying micro-segments with similar consumer behavior under program control by clustering the micro-segments based on the distance between matrix calculations defining segment clusters in order to identify segments with similar consumer behavior and storing said segment clusters on computer readable medium.

2. The computerized method as recited in claim 1 further comprising:
tagging the micro-segments with a macro-segment label and redefining the micro-segments based upon the macro-segment tags.

3. The computerized method as recited in claim 1 wherein the distance matrix is calculated between the generated segment exogenous curves.

4. The computerized method as recited in claim 1 wherein the distance matrix is calculated between the generated segment maturation curves.

5. The computerized method as recited in claim 1 wherein the distance matrix is calculated between the generated segment maturation curves and the generated segment maturation curves.

6. A computerized system for identifying segments of consumers having similar behavior consumer segments comprising:
a computer readable medium for storing a plurality of consumer micro-segments of consumer behavior;
a computing device for executing a segmentation program stored, on a computer readable medium, wherein when the segmentation program is executed:
micro-segments are retrieved from said computer readable medium and the micro-segments are processed to decompose the micro-segments into age-based components defining a segment maturation curve and time based components defining a segment exogenous curve and scaling parameters for each micro-segment:
a distance matrix is calculated between the micro-segments based on at least one of the generated decomposed curves; and
the micro-segments are clustered into a macro-segment based on the distance matrix calculations in order to identify micro-segments of consumers with similar behavior.

7. The computerized system as recited in claim 6 wherein the segmentation program, when executed, tags the micro-segments with a macro-segment label and redefines the micro-segments based upon the macro-segment tags.

8. The computerized system as recited in wherein the distance matrix is calculated between the generated segment exogenous curves.

9. The computerized system as recited in claim 6 wherein the distance matrix is calculated between the generated segment maturation curves.

10. The computerized system as recited in claim 6 wherein the distance matrix is calculated between the generated segment exogenous curves and the generated segment maturation curves.

11. A computer-readable medium for identifying micro-segments of consumers with similar behavior, the computer-readable medium encoded with a segmentation program, which, when executed by a computing device having a second computer readable medium for storing micro-segments of consumer behavior, the computing device performs a method comprising:
retrieving micro-segments from said second computer readable medium
processing said micro-segments to decompose the micro-segments into age based components defining a segment maturation curve and time-based components defining a segment exogenous curve and scaling parameters for each micro-segment;
calculating a distance matrix between the micro-segments based on at least one of the generated decomposed curves; and
clustering the micro-segments into a macro-segment based on the distance matrix calculations in order to identify micro-segments of consumers with similar behavior.

12. The computer-readable medium of claim 11 wherein the segmentation program, when executed, tags the micro-segments with a macro-segment label and redefines the micro-segments based upon the macro-segment tags.

13. The computer-readable medium of claim 11 wherein the distance matrix is calculated between the generated segment exogenous curves.

14. The computer-readable medium of claim 11 wherein the distance matrix is calculated between the generated segment maturation curves.

15. The computer-readable medium of claim 11 wherein the distance matrix is calculated between the generated segment exogenous curves and the generated segment maturation curves.

* * * * *

UNITED STATES PATENT AND TRADEMARK OFFICE
CERTIFICATE OF CORRECTION

PATENT NO. : 7,660,735 B1
APPLICATION NO. : 10/216510
DATED : February 9, 2010
INVENTOR(S) : Breeden et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1422 days.

Signed and Sealed this

Thirtieth Day of November, 2010

David J. Kappos
*Director of the United States Patent and Trademark Office*